United States Patent
White et al.

(10) Patent No.: US 6,290,747 B1
(45) Date of Patent: *Sep. 18, 2001

(54) CONVERSION OF IMPURE SILVER HALIDE TO ULTRA-PURE SILVER METAL

(75) Inventors: Weimar W. White, Canaseraga; Gary G. Kiehl, Hilton; Brian P. Cleary, Webster, all of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/457,170

(22) Filed: Dec. 8, 1999

(51) Int. Cl.[7] ............................... C22B 3/32; C22B 11/00
(52) U.S. Cl. .............................. 75/427; 423/27; 423/34; 423/395; 75/635; 75/636; 75/713; 75/744
(58) Field of Search ........................... 75/634, 635, 636, 75/744, 713, 427; 423/27, 34, 395

(56) References Cited

U.S. PATENT DOCUMENTS

| 2,543,792 | 3/1951 | Marasco et al. . | |
|---|---|---|---|
| 2,614,029 | 10/1952 | Moede . | |
| 3,554,883 | 1/1971 | Green . | |
| 4,078,918 | * 3/1978 | Perman | 75/713 |
| 5,000,928 | 3/1991 | White | 423/34 |
| 5,749,940 | 5/1998 | Narita | 75/711 |

FOREIGN PATENT DOCUMENTS

| 1287671 | 7/1970 | (GB) . |
|---|---|---|
| 2018828 | 4/1979 | (GB) . |
| 2336116 | 3/1991 | (GB) . |
| WO 98/58089 | 12/1998 | (WO) . |
| WO 98/58092 | 12/1998 | (WO) . |

OTHER PUBLICATIONS

Japanese Patent Abstract 61276907, Dec. 1986.

(List continued on next page.)

*Primary Examiner*—Roy King
*Assistant Examiner*—Tima McGuthry-Banks
(74) *Attorney, Agent, or Firm*—Sarah Meeks Roberts

(57) ABSTRACT

A method for preparing ultra-pure silver from a crude silver halide matrix containing metallic and/or non-metallic impurities, said method comprising;
   roasting the crude silver halide matrix to substantially remove carbonaceous material;
   treating the roasted crude silver halide matrix with ammonium hydroxide to dissolve the silver halides and form an ammonium hydroxide reaction mixture;
   adding an initial reducing agent to the ammonium hydroxide reaction mixture to precipitate a crude silver powder mixture;
   separating the crude silver powder mixture from the ammonium hydroxide reaction mixture
   dissolving the crude silver powder mixture in nitric acid to form a crude silver nitrate solution;
   adding a first selective reducing agent to the crude silver nitrate solution to precipitate a silver/contaminant matrix and form a partially purified silver nitrate solution;
   separating the partially purified silver nitrate solution from the precipitated silver/contaminant matrix;
   adding a second selective reducing agent to the partially purified silver nitrate solution to precipitate pure silver powder; and
   isolating the pure silver powder.

24 Claims, 1 Drawing Sheet

OTHER PUBLICATIONS

Ackerman, John B.; Nordwick, Suzzann M.; Anderson, Corby G.; Krys. L. Ernst, "Hydrometallurgy at the Sunshine Mine Metallurgical Complex", Sunshine Min. Co. Kellog, ID, *Hydrometall. Proc. Milton E. Wadsworth Int. Symp., 4th* (1993), 477–98. Editors: Hiskey, J. Brent; Warren, Garry W. Publisher: Soc. Min. Metall. Explor., Littleton, Colo.; Chpt. 30, pp. 492–493, No Month.

Banerjee, R. Das, K. Das, A. and Dasgupta, S., "Kinetics of Silver(I)–Catalyzed Oxidation of Formic Acid by the (Ethylenebis(biguanidine))silver(III) Cation in Acid Perchlorate Media", *Inorg. Chem.*, 1989, 28, 585–588, No Month.

* cited by examiner

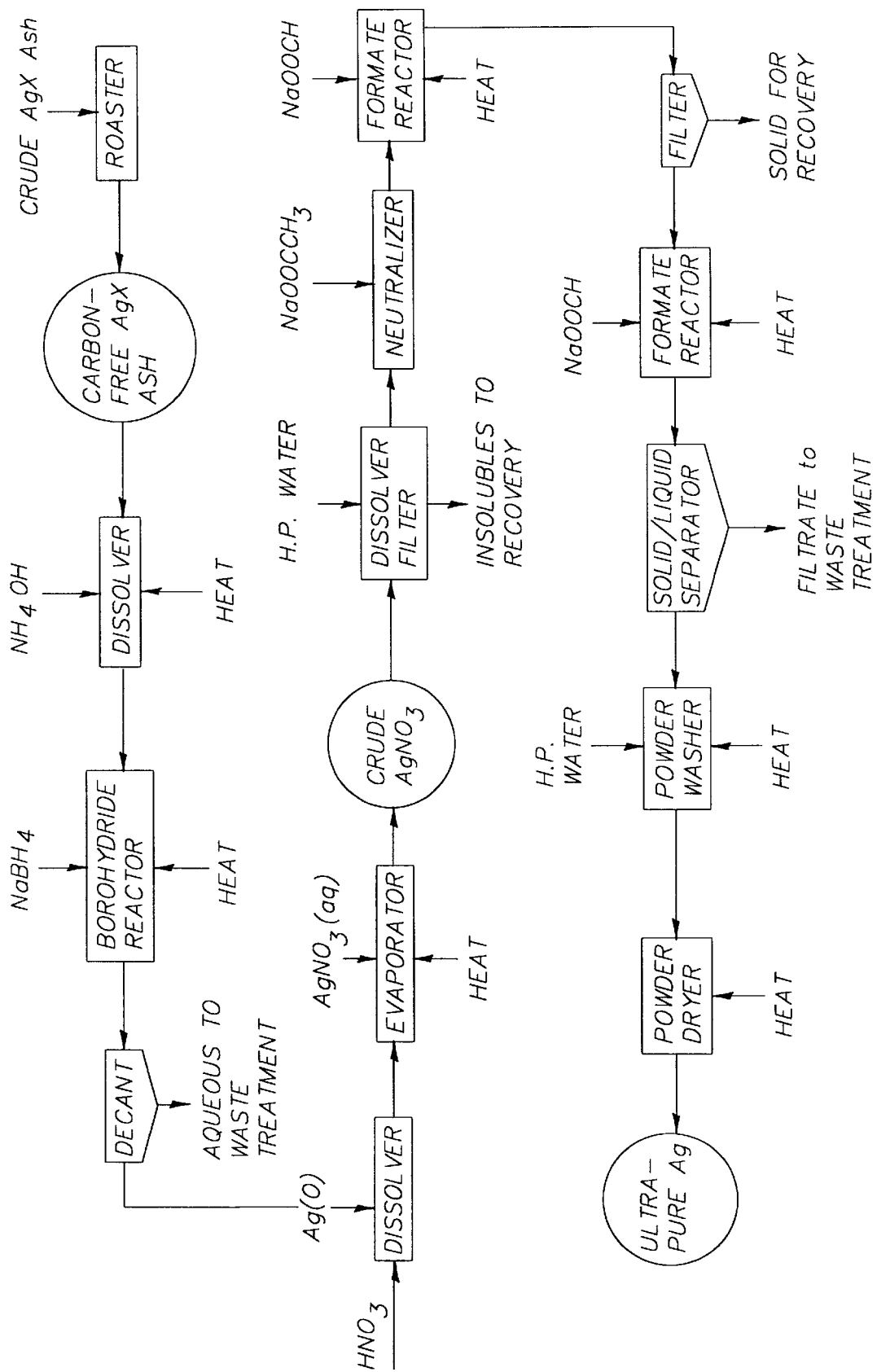

CONVERSION OF IMPURE SILVER HALIDE TO ULTRA-PURE SILVER METAL

FIELD OF THE INVENTION

This invention relates to the manufacture of silver metal and in particular to the preparation of silver metal with a very high degree of purity. More specifically, this invention relates to a novel multi-step process for converting impure silver halide containing ash to ultra-pure silver metal.

BACKGROUND OF THE INVENTION

Silver that is of very high purity has many important industrial applications including the manufacture of materials in the electronics industry and the preparation of silver nitrate for the photographic industry. Typically, the process for purifying silver relies on smelting, electrolysis or a combination of smelting and electrolysis.

Smelting is a pyrometallurgical process by which crude silver metal and or ionic silver containing compounds are heated in the presence of a flux. The silver ions are chemically reduced to silver metal and as a result of the extreme temperatures of the process, the silver metal melts and drops to the bottom of a reaction furnace. Meanwhile, base metals such as copper, iron, zinc, lead, nickel, etc., if present, remain oxidized and accumulate in the less dense slag waste stream. Finally, the molten silver is poured from the smelter and cooled in a casting. The process of smelting is inefficient with respect to mass balance and requires several days to complete. Furthermore, the precious metals, namely gold, palladium, platinum, rhodium, iridium, osmium and ruthenium remain in the purified silver and require separation during a secondary refining process such as electrorefining. Finally, sulfur and its congeners, selenium and tellurium, if not oxidized in the smelter, will be present in the purified silver and a second refining might be necessary.

Electrorefining also may be used to purify silver. Here, impure silver metal, typically pre-purified by smelting, is cast as an anode and is deposited as purified silver crystals at the cathode in an electrolytic cell. However, in this process silver ions are required to pass through an electrolyte, typically silver nitrate, that may contain an increased concentration of impurities from previously dissolved anodes. Frequent purges of the electrolyte are required to produce silver that is acceptable for use in applications that require high purity. Additionally, varying levels of sulfate, antimony, iron and sulfide are often found to be associated with electrorefined silver.

Hydrometallurgy is a less widely practiced method for refining silver. In practice, aqueous solutions of silver ions are reduced chemically to yield silver metal and, ideally, impurities are left in the aqueous phase. Depending on the identity of the impurities present in the silver matrix, it may be difficult to select a reducing agent of the appropriate strength. While the strength of the reducing agent or its propensity to reduce other species can be obtained from a table of thermodynamic electrochemical reduction potentials; it is not always possible to select a reducing agent that will selectively reduce silver ions to silver powder and leave all of the matrix impurities in a concentrated solid or in the aqueous phase.

The following are representative of the many references describing the purification of ionic silver or the preparation of silver powder from ionic silver solutions. For example, U.S. Pat. No. 5,749,940 describes a process for producing silver from de-copperized anode slime. The method relies on several leaching and separating steps and the one time addition of a reducing agent, dextrose, or hydrazine-a known carcinogen. GB 2,236,116 describes a process of producing silver powders of desired particle sizes from silver nitrate using formate and citrate in a one time addition. JP 61276907 describes the formation of monodisperse silver powders by treatment of aqueous silver nitrate in a gelatin solution with glucose. It also has been reported that crude silver chloride may be converted to silver oxide via the addition of caustic and subsequently reduced to silver metal by dextrose; but the final silver sponge requires secondary purification using electrorefining (Ackerman, John B.; Nordwick, Suzzann M.; Anderson, Corby G.; Krys. L. Ernst. Sunshine Min. Co. Kellog, ID, 83837, USA. Hydrometall. Proc. Milton E. Wadsworth Int. Symp., $4^{th}$ (1993), 477–98. Editors: Hiskey, J. Brent; Warren, Garry W. Publisher: Soc. Min. Metall. Explor., Littleton, Colo.; Chpt. 30, pp 492–493).

RO 85165 describes a process of producing silver powder from silver nitrate using a one step addition of citric acid. Historically, metallic impurities are removed from aqueous silver ions by treating the matrix with a reagent to precipitate the impurities as metallic hydroxides. U.S. Pat. No. 2,543,792 describes the purification of aqueous silver nitrate with carbon, activated alumina and silver oxide. U.S. Pat. No. 2,614,029 describes the treatment of aqueous silver nitrate with silver oxide to maintain a pH of 6.1, the separation of the metal hydroxides which result from the solution, and the contact of the solution with a water insoluble porous solid absorbent such as activated alumina or magnesia. U.S. Pat. No. 3,554,883 describes a process of mixing silver nitrate with silver oxide to yield a pH of 5.1 to 5.8 causing the formation of a precipitate which is removed. The silver nitrate is subsequently treated with a second addition of silver oxide to yield a pH of 5.9 to 6.3 causing the formation of a second precipitate which is removed yielding a purified silver nitrate solution. Finally, U.S. Pat. No. 5,000,928 describes a process that yields ultra-pure silver nitrate from crude silver using a one time addition of sodium hydroxide to remove metal contaminates as hydroxy or oxy compounds; and a one time addition of sodium formate to yield silver metal which is subsequently converted to ultra-pure silver nitrate.

Even with all of the work which has been done around the purification of impure silver metal, there still remains a need for a less complex process to purify silver. Also needed is a process which has lower silver loss in the recovery stream. This must be accomplished while providing a silver purity level at least as high as that achieved by current technology.

SUMMARY OF THE INVENTION

This invention provides a method for preparing ultra-pure silver from a crude silver halide matrix containing metallic and/or non-metallic impurities, said method comprising;

roasting the crude silver halide matrix to substantially remove carbonaceous material;

treating the roasted crude silver halide matrix with ammonium hydroxide to dissolve the silver halides and form an ammonium hydroxide reaction mixture;

adding an initial reducing agent to the ammonium hydroxide reaction mixture to precipitate a crude silver powder mixture;

separating the crude silver powder mixture from the ammonium hydroxide reaction mixture dissolving the crude silver powder mixture in nitric acid to form a crude silver nitrate solution;

adding a first selective reducing agent to the crude silver nitrate solution to precipitate a silver/contaminant matrix and form a partially purified silver nitrate solution;

separating the partially purified silver nitrate solution from the precipitated silver/contaminant matrix;

adding a second selective reducing agent to the partially purified silver nitrate solution to precipitate pure silver powder; and isolating the pure silver powder.

This invention is particularly useful when the first and second selective reducing agents are both sodium formate.

The method of the invention has numerous advantages. The inventive process produces silver that is of high enough purity for direct use in the production of photographic quality silver nitrate. The process is simple and employs inexpensive and commercially available reagents for the preparation of the ultra-pure silver metal. The by-products of the silver metal forming reaction are benign and the platinum group metal impurities are collected and concentrated in the first reduction-fraction and can be refined further or sold. The process has lower silver loss in the recovery stream. Finally, the process can be performed within a short time frame.

BRIEF DESCRIPTION OF THE DRAWINGS

The single FIGURE of the drawing is a schematic flow diagram depicting the novel multi-step process of this invention.

DETAILED DESCRIPTION OF THE INVENTION

The crude silver halide matrix that is used as the starting material in the process of this invention generally comes from residues resulting from the incineration of photographic media and from dewatered, silver halide-rich waste water streams. Each recovery stream may have associated with it a large number of metallic and non-metallic contaminants which may include, for example, gold, platinum, copper, iron, zinc, lead, nickel, sulfide etc. The inventive process is most useful in purifying crude silver halide mixtures containing both metallic and non-metallic contaminants.

In the first step of the process, the crude silver halide matrix is roasted in an oxidizing atmosphere to remove gross amounts of carbonaceous materials. Many methods of performing this step are available and are known to those skilled in the art. While many time and temperature ranges may be utilized, in one embodiment, for a matrix containing 5–7% combustible organic material by weight, the carbonaceous material may be substantially removed by heating the matrix in air for 30 to 40 minutes at a temperature of 475 to 525° C.

Subsequently the resulting roasted crude silver halide matrix, mainly comprised of silver bromide, silver chloride and silver iodide, is treated with ammonium hydroxide to dissolve the silver halides yielding an ammonium hydroxide reaction mixture-$[Ag(NH_3)_2]X$ (X=Cl, Br, I) according to eq 1. Dissolution may be carried out at a broad temperature range, preferably from ambient to 100° C., and more preferably at about 80° C. The strength and amount of the ammonium hydroxide utilized is not critical, although there may be practical considerations. In one embodiment 25 mL ammonium hydroxide per 11.5 g of silver may be utilized. Very dilute ammonium hydroxide or ammonium hydroxide with no water diluent may be used in this process.

Next, the ammonium hydroxide reaction mixture is treated with an initial reducing agent to yield a crude silver powder mixture. The sole purpose of the reduction in this step is to form crude silver powder from which crude silver nitrate may be prepared. Several reducing agents may be used for this reduction including, for example, copper, iron, formaldehyde, sodium formate, hydrogen, sodium hyposulfite, tin(II) chloride, zinc, mercury, sugars such as dextrose and glucose, and aldehydes. A sodium hydroxide stabilized solution of sodium borohydride is the preferred initial reducing agent for use in the method of this invention and its reaction with $[Ag(NH_3)_2]Br$ is shown in equation 2.

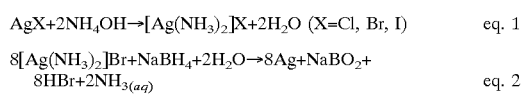

$$AgX+2NH_4OH \rightarrow [Ag(NH_3)_2]X+2H_2O \ (X=Cl, Br, I) \qquad \text{eq. 1}$$

$$8[Ag(NH_3)_2]Br+NaBH_4+2H_2O \rightarrow 8Ag+NaBO_2+ \\ 8HBr+2NH_{3(aq)} \qquad \text{eq. 2}$$

The HBr formed in this example is neutralized either by reaction with sodium hydroxide or ammonium hydroxide present in the reaction mixture. In one embodiment the crude silver powder mixture precipitated by the initial reducing agent may be allowed to settle at the bottom of the reaction vessel while the insoluble and less dense materials, such as $Ca_3(PO_4)_2$, $TiO_2$ and $SiO_2$ concentrate above the silver phase. The less dense materials can be easily removed via decantation or floatation techniques. It is preferred that the crude silver powder mixture be washed to remove the soluble halide anions from the system since these elements will react with $Ag^+_{(aq)}$ in subsequent steps in the process.

Next the crude silver powder mixture is dissolved in nitric acid to form a crude silver nitrate solution. Dissolution of the silver containing mixture is typically carried out between 90° C. and 100° C., but can be done at any appropriate temperature. The equation for the dissolution of silver metal in nitric acid is described in eq 3.

$$4Ag+6HNO_3 \rightarrow 4AgNO_3+NO+NO_2+3H_2O \qquad \text{eq. 3}$$

After dissolution and formation of the crude silver nitrate solution, it is preferred that the crude silver nitrate solution is dried, preferably by boiling off the solvent, which results in the formation of a crude silver nitrate solid. While it is possible to continue the process using the crude silver nitrate solution, the advantage of this drying step is two fold. One, all silver matrices can be treated equally after they are converted to the form of solid silver nitrate. Two, since the quantity of acid is reduced during the drying step, subsequent pH adjustments can be made easily with the salt of a weak acid, preferably sodium acetate. The solid silver nitrate is then dissolved in water. Preferably enough water is added to dissolve the solid silver nitrate into a dilute solution, suitably one having a 15 to 25 percent by weight concentration of silver nitrate. Some impurities, such as sulfur which is precipitated as silver sulfide, are much less soluble in a dilute silver nitrate solution and, thus, can be removed as a solid in a subsequent step. Also, insoluble species such as gold, for example, are easily removed here via filtration.

If necessary the silver nitrate solution is then adjusted to a suitable pH level, preferably from about 4.0 to about 4.8, but most preferably from about 4.3 to about 4.5. Preferably the salt of a weak acid is added to adjust the pH. The salt of the weak acid also serves to buffer the solution during the first addition of the reducing agent. Alkali salts of acetic acid are preferred because of their low cost and the observation that the silver salt formed during the acetate addition remains in solution. Sodium acetate is the most preferred form. Too high a pH will result in the crystallization of silver acetate while too low a pH results in the dissolution of silver powder produced in the subsequent step.

Following the pH adjustment a selective reducing agent is added to the silver nitrate solution. This may be done within a large temperature range, but preferably at 70 to 100° C.

Herein, the term "selective reducing agent" refers to a chemical that will reduce silver nitrate to silver powder and the precious metal contaminants to their respective metal powders, or will cause some contaminates, such as iron, bismuth, tin, and aluminum, to precipitate in the form of compounds. Mercury containing impurities are also presumed to be amalgamated during this addition. Examples of selective reducing agents include formic acid, alkali formates, hydrazine, alkali borohydrides, iron(II) sulfate, tin (II) sulfate, hypophosphorus acid, metal hypophosphites, sulfurous acid, hydroxylamine, organic hydroxy acids such as tartaric acid and ascorbic acid, sugars such as dextrose and glucose, aldehydes, hydroquinone, salts of hydrosulfite, and reducing gases such as carbon monoxide and hydrogen. It is preferable that only a small amount, preferably about 0.003 to about 0.01 mols of the reducing agent per mol of silver and most preferably about 0.003 to about 0.005 mols of the reducing agent to one mol of silver, is added since the purpose of this step is to precipitate all reducible contaminates into a small, isolable matrix of silver powder. In one suitable embodiment, about 0.005 mols per mol of silver is added. The addition of too much of the first selective reducing agent will lower the final yield of purified silver, while the addition of too little will not precipitate out the contaminants. The precipitated contaminants are referred to herein as the silver/contaminant matrix.

Metal formates, especially alkali formates and most preferably sodium formate, are the preferred selective reducing agents for use in the method of this invention. Sodium formate is particularly preferred because of its high degree of selectivity, its rapid reaction rate, the fact that it does not form degradation products that are detrimental to the reaction system, and its low cost and availability.

The reaction of silver nitrate with sodium formate is described in equations 4–6 below (Banerjee, R.; Das, K.; Das, A.; Dasgupta, S. *Inorganic Chemistry* 1989, 28 585–588)

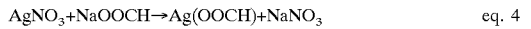

$$AgNO_3 + NaOOCH \rightarrow Ag(OOCH) + NaNO_3 \qquad \text{eq. 4}$$

$$AgNO_3 + Ag(OOCH) \rightarrow 2Ag(0) + HNO_3 + CO_2 \qquad \text{eq. 5}$$

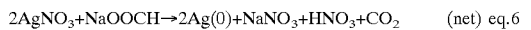

$$2AgNO_3 + NaOOCH \rightarrow 2Ag(0) + NaNO_3 + HNO_3 + CO_2 \qquad \text{(net) eq. 6}$$

Nitric acid is produced during the reduction according to eq 5 and can dissolve the freshly precipitated silver matrix. However, the presence of acetate serves to buffer the solution and prevent silver dissolution. Subsequently, the partially purified silver nitrate solution is separated from the silver/contaminant matrix by any suitable means, preferably by filtration. Since this matrix is rich in precious metal contaminates it can be recovered at a later time or sold as gold and palladium enriched silver waste.

After the first addition of the selective reducing agent and removal of the silver/contaminant matrix, the partially purified silver nitrate solution is treated by a second addition of a selective reducing agent. Again, this may be done within a large temperature range, but preferably at 70 to 100° C. The second selective reducing agent may be the same or different from the first selective reducing agent, although it is preferred that they be the same. The addition of the second selective reducing agent reduces substantially all of the remaining silver in solution to silver powder. The silver powder is produced in an environment that is substantially free of reducible impurities since these contaminants were removed in the precipitated silver waste (silver/contaminant matrix) which resulted from the initial reducing agent addition. The non-reducible impurities such as alkali metals, alkaline earth metals, base metals and anions remain in solution and can be separated later from the ultra-pure silver powder.

Normally the second selective reducing agent may be added in the amount of about one mol +/−5% of silver reducing agent per mol of silver. When sodium formate is utilized as the second selective reducing agent, however, it is preferable that at least two mols of sodium formate per mol of silver is added since the excess formate is able to neutralize the nitric acid produced according to eq 4 by forming formic acid. Formic acid is a weak acid; therefore the pH of the solution (and thus the ability of components in the reaction mixture to dissolve the freshly precipitated silver powder) will be governed by the Ka of formic acid, and the concentration of the formic acid and free formate. In the cited examples, silver powder dissolution is minimized using the two fold excess of sodium formate as overall yields approach 100%.

After the second and final selective reduction, the silver powder is separated from the aqueous solution by a suitable procedure such as decantation, centrifugation or filtration, and then may be washed several times with boiling high purity water to remove alkali metal impurities and then dried. The silver powder produced in this manner is suitable for direct use in the manufacture of silver nitrate designated for the manufacture of photographic products or for other processes which require ultra-pure silver. Preferably the resulting silver has a purity of 99.99%.

The following examples are intended to illustrate, but not to limit, the invention.

EXAMPLE

In this example, crude silver halide ash was used which was recovered from a combination of dewatered silver halide rich waste-water and silver halide rich ash from the incineration of photographic media. A sample of 500 g of incompletely combusted roaster ash was heated to 600° C. for several hours to remove carbonaceous material. To 50.0 g of the fully combusted ash was added 230 mL of water and 25 mL of concentrated ammonium hydroxide. To the stirred suspension was added 60 mL of 5% sodium borohydride in 5% aqueous sodium hydroxide. The suspension was stirred for 10 minutes, heated to and maintained at boiling for ten minutes and then allowed to cool to room temperature. The reaction mixture was stirred while 1700 mL of water was added. After the suspension was allowed to stand for 15 minutes, the low-density solids were decanted from the mixture. The mixture was treated similarly two more times for a total of three 1700 mL additions and decantation cycles. To the crude silver metal was added 100 mL of concentrated nitric acid. The mixture was heated between 50° C. and 90° C. until the silver was completed dissolved. The solution was then boiled to dryness and the resulting silver nitrate solid was dissolved in 450 mL of high purity water. The suspension was filtered and the solid was washed with 50 mL of water. To the silver nitrate solution was added 0.4 g of sodium acetate followed by 0.1 g of sodium formate. The solution was boiled for 10 minutes. The reaction mixture was filtered and the filtrate was treated with an additional 23 g of sodium formate. The reaction mixture was boiled until the liquid above the precipitated silver powder was clear. The liquor was decanted from the silver powder and the resulting powder was washed with boiling high purity water three times. After decantation of the final wash, the silver powder was dried at 100° C. for 12 hours.

TABLE 1

Silver Metal Recovered From Roaster Ash

| Contaminant | Concentration in Crude Silver Halide (μg/g) | Concentration in First Silver Fraction (μg/g) | Concentration in Ultra-Pure Silver (μg/g) |
| --- | --- | --- | --- |
| Au | 16 | 2.0 | 0.062 |
| Bi | 0.3 | 0.02 | <0.001 |
| Cd | 8.3 | <0.05 | <0.004 |
| Cr | 200 | 38 | 0.019 |
| Cu | 120 | 38 | 0.022 |
| Fe | 1200 | <2 | <0.1 |
| Hg | <0.3 | <0.1 | 0.003 |
| Ir | 0.3 | 0.15 | 0.002 |
| Mn | 6.4 | 1.3 | 0.004 |
| Na | 2100 | <5 | 4.2 |
| Ni | 16 | 0.40 | 0.006 |
| Pb | 130 | 11 | 0.72 |
| Pd | 9.1 | 37 | 0.08 |
| Pt | <0.05 | 0.21 | <0.001 |
| Rh | 0.16 | 0.01 | <0.001 |
| Sb | 260 | 12 | 0.34 |
| S | NR | 1900 | <2 |
| Se | <35 | <7 | 0.03 |
| Sn | 710 | 20 | 0.12 |
| Te | 0.5 | <0.4 | <0.001 |
| Zn | 1900 | 100 | 0.22 |

The invention has been described in detail with particular reference to certain preferred embodiments thereof, but it will be understood that variations and modifications can be effected within the spirit and scope of the invention.

What is claimed is:

1. A method for preparing ultra-pure silver from a crude silver halide matrix containing metallic and/or non-metallic impurities, said method comprising;

roasting the crude silver halide matrix to substantially remove carbonaceous material;

treating the roasted crude silver halide matrix with ammonium hydroxide to dissolve the silver halides and form an ammonium hydroxide reaction mixture;

adding an initial reducing agent to the ammonium hydroxide reaction mixture to precipitate a crude silver powder mixture;

separating the crude silver powder mixture from the ammonium hydroxide reaction mixture;

dissolving the crude silver powder mixture in nitric acid to form a crude silver nitrate solution;

adding a first selective reducing agent that will reduce silver nitrate to silver powder to the crude silver nitrate solution to precipitate a silver/contaminant matrix and form a partially purified silver nitrate solution;

separating the partially purified silver nitrate solution from the precipitated silver/contaminant matrix;

adding a second selective reducing agent to the partially purified silver nitrate solution to precipitate pure silver powder; and isolating the pure silver powder.

2. The method of claim 1 wherein the first and second selective reducing agents are both sodium formate.

3. The method of claim 1 wherein the first selective reducing agent is added in the amount of about 0.003 to 0.01 mols per mol of silver.

4. The method of claim 2 wherein the first selective reducing agent is added in the amount of about 0.003 to 0.01 mols per mol of silver.

5. The method of claim 1 wherein prior to adding the first selective reducing agent the pH is adjusted to from about 4.0 to about 4.8.

6. The method of claim 2 wherein prior to adding the first selective reducing agent the pH is adjusted to from about 4.0 to about 4.8.

7. The method of claim 1 wherein prior to adding the first selective reducing agent the crude silver nitrate solution is dried to form a crude silver nitrate solid which is then redissolved in water.

8. The method of claim 2 wherein prior to adding the first selective reducing agent the crude silver nitrate solution is dried to form a crude silver nitrate solid which is then redissolved in water.

9. The method of claim 2 wherein the second selective reducing agent is added in the amount of at least 2 mols of sodium formate to 1 mol of silver.

10. The method of claim 5 wherein the pH is adjusted with a salt of acetic acid.

11. The method of claim 10 wherein the salt of acetic acid is sodium acetate.

12. The method of claim 6 wherein the pH is adjusted with a salt of acetic acid.

13. The method of claim 12 wherein the salt of acetic acid is sodium acetate.

14. The method of claim 1 wherein the initial reducing agent is a stabilized solution of sodium borohydride.

15. The method of claim 2 wherein the initial reducing agent is a stabilized solution of sodium borohydride.

16. A method for preparing ultra-pure silver from a crude silver halide matrix containing metallic and/or non-metallic impurities, said method comprising;

roasting the crude silver halide matrix to substantially remove carbonaceous material;

treating the roasted crude silver halide matrix with ammonium hydroxide to dissolve the silver halides and form an ammonium hydroxide reaction mixture;

adding an initial reducing agent to the ammonium hydroxide reaction mixture to precipitate a crude silver powder mixture;

separating the crude silver powder mixture from the ammonium hydroxide reaction mixture;

dissolving the crude silver powder mixture in nitric acid to form a crude silver nitrate solution;

drying the crude silver nitrate solution to form a crude silver nitrate solid which is then redissolved in water to form a second crude silver nitrate solution;

adjusting the pH of the second crude silver nitrate solution to from about 4.0 to about 4.8;

adding a first addition of sodium formate in the amount of about 0.003 to 0.01 mols per mol of silver to the pH adjusted crude silver nitrate solution to precipitate a silver/contaminant matrix and form a partially purified silver nitrate solution;

separating the partially purified silver nitrate solution from the precipitated silver/contaminant matrix;

adding a second addition of sodium formate to the partially purified silver nitrate solution to precipitate a silver powder; and isolating the silver powder.

17. The method of claim 16 wherein the pH is adjusted with a salt of acetic acid.

18. The method of claim 17 wherein the salt of acetic acid is sodium acetate.

19. The method of claim 16 wherein the first addition of sodium formate is made in the amount of about 0.003 to about 0.005 mols per mol of silver.

20. The method of claim 16 wherein the second addition of sodium formate is made in the amount of at least 2 mols of sodium formate per 1 mol of silver.

21. The method of claim 19 wherein the second addition of sodium formate is made in the amount of at least 2 mols of sodium formate per 1 mol of silver.

22. The method of claim 21 wherein the pH is adjusted with sodium acetate.

23. The method of claim 16 wherein the initial reducing agent is a stabilized solution of sodium borohydride.

24. The method of claim 22 wherein the initial reducing agent is a stabilized solution of sodium borohydride.

* * * * *